(12) United States Patent
Zhou et al.

(10) Patent No.: US 7,211,230 B2
(45) Date of Patent: May 1, 2007

(54) PROCESS FOR PRODUCING NANOMETER GRADE POWDERS

(75) Inventors: Yingyan Zhou, Liaoning (CN); Shoushan Gao, Liaoning (CN); Hongxia Li, Liaoning (CN); Kaiming Wang, Liaoning (CN); Xiaoqi Li, Liaoning (CN); Lixiang Li, Liaoning (CN); Chuangeng Wen, Liaoning (CN)

(73) Assignee: Anshan University of Science and Technology, Liaoning, P.R. (CN)

( * ) Notice: Subject to any disclaimer, the term of this patent is extended or adjusted under 35 U.S.C. 154(b) by 253 days.

(21) Appl. No.: 10/471,142

(22) PCT Filed: Mar. 5, 2002

(86) PCT No.: PCT/CN02/00138

§ 371 (c)(1),
(2), (4) Date: Feb. 6, 2004

(87) PCT Pub. No.: WO02/070409

PCT Pub. Date: Sep. 12, 2002

(65) Prior Publication Data

US 2004/0115123 A1 Jun. 17, 2004

(30) Foreign Application Priority Data

Mar. 7, 2001 (CN) .......................... 2001 1 0006279

(51) Int. Cl.
*C01B 13/00* (2006.01)
*C01B 17/20* (2006.01)
*C01B 25/08* (2006.01)
*C01G 1/00* (2006.01)

(52) U.S. Cl. .......................... 423/1; 423/592.1; 423/579; 423/462; 423/299; 423/561.1; 423/608; 423/69; 423/622; 423/101; 423/598; 423/594.16; 423/71; 423/84; 423/85; 75/739; 75/740; 977/773; 977/775; 977/776; 977/777

(58) Field of Classification Search .................. 423/1, 423/592.1, 579, 462, 299, 561.1, 69, 622, 423/101, 598, 594.16, 71, 84, 85, 608; 75/739, 75/740; 977/773, 775, 776, 777
See application file for complete search history.

(56) References Cited

U.S. PATENT DOCUMENTS

| | | | | |
|---|---|---|---|---|
| H0429 H | * | 2/1988 | Harris et al. ............. | 423/566.1 |
| 5,417,956 A | * | 5/1995 | Moser ..................... | 423/592.1 |
| 5,458,867 A | | 10/1995 | Ritter | |
| 5,938,837 A | | 8/1999 | Hanawa et al. | |
| 6,444,189 B1 | * | 9/2002 | Wang et al. ................ | 423/610 |
| 6,806,295 B2 | * | 10/2004 | Hu .............. | 516/22 |
| 2004/0131538 A1 | * | 7/2004 | Ohzeki ................... | 423/592.1 |
| 2004/0253170 A1 | * | 12/2004 | Zhou et al. ............. | 423/592.1 |
| 2005/0031517 A1 | * | 2/2005 | Chan ........................ | 423/263 |
| 2005/0281733 A1 | * | 12/2005 | Tsay et al. .................. | 423/598 |

FOREIGN PATENT DOCUMENTS

| | | |
|---|---|---|
| CN | 1116146 | 2/1996 |
| CN | 1258639 | 7/2000 |
| CN | 1276345 | 12/2000 |
| WO | WO 94/04459 | 3/1994 |
| WO | WO 98/22387 | 5/1998 |
| WO | WO 00/23181 | 4/2000 |

* cited by examiner

*Primary Examiner*—Timothy C. Vanoy

(74) *Attorney, Agent, or Firm*—Knobbe, Martens, Olson & Bear, LLP

(57) ABSTRACT

The present invention discloses a process for producing nanometer powders, comprising the following steps: (a) providing reactant solution A and reactant solution B that can rapidly react to form precipitate; (b) continuously adding said solution A and solution B into a mixing and reacting precipitator with a stator and a rotor in operation, respectively; and (c) post-treating the precipitate-containing slurry discharged continuously from the mixing and reacting precipitator. The present process could produce nanometer powders with adjustable particle size, good homogeneity in size and good dispersity. The method also has the characteristics of high production yield, simplicity in process and low consumption of energy. It could be applied to produce various nanometer powders of metals, oxides, hydroxides, salts, phosphides and sulfides as well as organic compounds.

23 Claims, 8 Drawing Sheets

PROCESS FOR PRODUCING NANOMETER GRADE POWDERS

RELATED APPLICATIONS

This Application is a National Phase under U.S.C. §371 of the International Application PCT/CN02/00138, filed Mar. 5, 2002 designating the US and published in Chinese as WO 02/70409, which claims the benefit of priority of a Chinese patent application 01106279.7 filed Mar. 7, 2001, the disclosure of which is incorporated herein by reference in its entirety.

FIELD OF THE INVENTION

The present invention relates to a method of preparation for ultra fine powders. More specifically it relates to a method of preparation for nanometer grade powders, especially to a method utilizing liquid phase chemical reaction precipitation to prepare nanometer grade powders.

BACKGROUND OF THE INVENTION

It is well known that particulates of metals or metal oxides with sizes at nanometer level or submicron level are very useful industrial products in many fields of application. These applications include the manufacture of catalysts used in chemical industry, pottery and porcelain, electronic elements, coating, capacitor, mechanical-chemical polishing slurry, magnetic tape and fillers for plastics, paint or cosmetics.

It is possible to produce ultra fine particulates of metals or metal oxides by many different technologies including high temperature gas phase method, mechanical method, chemical method and etc. Reviews on the general technology of the production of nanometer grade particulate were published in the following papers: V. Hlavacek and J. A. Puszynski, "Advances in the Chemical Industry of Advanced Ceramics", Industrial Engineering and Chemistry Research, 1996, vol. 35, 349–377; "Advances on the Method of Preparation for Nanometer Particulates", Chemistry Bulletin (in Chinese), 1996, No. 3, 1–4. In CN 1217387A, there was also a detailed discussion on the advantages and disadvantages of the different technologies.

The process of the liquid phase precipitation method is simple. When compared with the gas phase method, solid phase method or other liquid phase method, its controlling condition is not so critical and its cost is lower. Therefore nowadays the liquid phase precipitation method becomes one of the widely used methods.

The characteristics of the process of the common liquid phase precipitation method are as follows: Stirring pot is used to carry out mixing reaction. At least one of the reactant solutions is gradually added into the pot by dropping, flowing in or spraying for a relatively long time. Using this technology to prepare nanometer particulates although has the advantage of simple operation, low cost and high yield, however the method has three generally recognized disadvantages: (1) It is difficult to control particle diameter; (2) It is difficult to obtain very small particle diameter; (3) It is difficult to eliminate hard agglomeration among particulates. The origin of the drawbacks of the pot technology comes from too long feeding time for one of the reactant solution and from the stirring together of the reaction, product and precipitate formed at different stage of time. Nuclei formed at the initial stage will undergo growth and collision coalescence among small particulates to form nanometer particulates. Due to long time, nanometer particulates will grow to relatively larger in size and will agglomerate together among nanometer particulates. The participation of the product formed in the later stages will induce agglomeration hardening. As mentioned above, these are the causes of the above-mentioned three drawbacks of the large pot technology in preparing nanometer powder.

Therefore, people successively developed different kinds of process of liquid phase precipitation method for producing nanometer powder without the use of stirring pot. Patent Appl. SE 99/01881 disclosed the following method and facilities: On the basis of a stream of carrier fluid flowing continuously in a pipe, two kinds of reactant solutions were injected in the form of periodical, intermittent pulse into the pipe at the same location. The reaction zone where the mixing of the injected two reactant solutions took place was separated in the carrier fluid. The lasting time for the course of mixing, reacting, and forming precipitate was very short. The said invention claimed that the quality of the nanometer particulates was very good, with particulate size at 10–20 nm, slight inter-particulate agglomeration or even no agglomeration. The drawbacks of that method are: (1) Reactant solutions are injected in pulse mode and the mixing process is not continuous. Thus the process is not favorable for large-scale continuous industrial production. Since carrier fluid must be used, the manufacturing process gets complex. It not only consumes carrier fluid but also needs to add a process of separation treatment for the carrier fluid and etc and thus increases the production cost. (2) The said method does not take any effective measures to reinforce and to adjust the mechanical mixing efficiencies of the two reactant solutions. Therefore it is not possible to effectively control the mechanical mixing efficiency of the reactant solutions. The above two drawbacks both shall be improved.

Other 2 papers, "Preparation of Strontium Carbonate Nanometer Powder by Liquid-Liquid Method in Rotating Packed Bed", Science and Technology in Chemical Industry (in Chinese), 1999, 7(4) 11–14 and "Experimental Study on Microscopic Mixing in Rotating Packed Bed", Chemical Reaction Engineering and Technology (in Chinese), 1999, 9, Vol. 15, No. 3, 328–332, described another kind of continuous process without the use of stirring pot. Two reactant solutions were allowed to pass continuously through rotating packed bed at one time. In the rotating packed bed, two reactant solutions mixed, reacted, formed nuclei and formed nanometer particulates. The paper stated that under the action of super gravity, the reactant solutions passed through the rotating packed bed and were dispersed, broken by the packing and formed very large and continuously refreshing surface area, greatly reinforced the material transfer condition. Besides, the process of rotating packed bed has the advantage of high intensity of fluid passage and short resident time. However, there were still some drawbacks in the method of super gravity rotating packed bed. Due to the high compactness of the fillers such as steel wire net and in the packed bed, what obtained by the solution was not the action of stirring and shear. When solution entered into the packed bed, it as a whole rotated with the packed bed and obtained centrifugal force. Under the action of centrifugal force, the solution would flow from inner fringe of the rotor to outer fringe along the interstitials of the packing and in the course of this process, mixing of solution took place. The mechanical mixing intensity and the adjusting sensitivity of such kind of mixing were not high enough and thus the performance of the preparation of nanometer powder was not ideal. Except for nanometer powder of $CaCO_3$ and $SrCO_3$, no report on the successful preparation of important species such as $ZrO_2$, $TiO_2$ by using rotating packed bed was disclosed. Therefore the said method seems to need further improvements.

As mentioned above, a good mixing and reacting facility for continuous passage of two reactant solutions should have the characteristics of high mechanical mixing intensity, adjustable mechanical mixing intensity and simplicity of structure. Within such facility, the solution should acquire vigorous stirring, shear and turbulence and would quickly be separated, broken into isolated very small sized micro liquid agglomerates in order to enlarge the interface of the two solutions thus to provide good conditions for the processes of molecular diffusion, chemical reaction, nucleation and etc.

Therefore, the objective of the present invention is to provide a method of preparing nanometer powder by liquid phase precipitation. The method of the present invention adopts a mixing facility which is simple in structure, could provide high and adjustable mechanical mixing intensity and could be used for large-scale production of good quality nanometer powder. The said method is widely applicable in the production of nanometer powders of oxides, hydroxides, salts, metals and etc.

After consulting the following text, readers would have a better understanding on the objective, advantages and features of the present invention.

SUMMARY OF THE INVENTION

The present invention provides a method of preparation for nanometer powders, comprising the following steps:
providing A and B reactant solutions that can rapidly react with each other to form precipitate;
continuously adding respectively A and B solutions into mixing and reacting precipitator with a stator and a rotor in operation; and
post-treating the precipitate-containing slurry discharged continuously from the precipitator.

It is believed that readers would have a better understanding on the present invention after reading the following detailed description coupled with attached figures.

DETAILED DESCRIPTION OF THE PREFERRED EMBODIMENT

Although not intend to be limited by any theory, it should be pointed out that the present inventor put forward the present technical solution on the basis of inventor's theory integrated with experimental results. It should be pointed out that the following theory is used only to explain the present invention and not to impose any limitation on the present invention.

It could be drawn from the experimental observation and mechanism analysis that when two reactant solutions that could react rapidly to form precipitate meet together, a group of nuclei will explosively be formed at the fresh interface of two solutions. After the explosive nuclei formation, new nuclei will no longer be formed at that place. Let the reactants of A and B be represented by $\alpha$ and $\beta$, the equation of reaction will be $$\alpha + \beta = \gamma + \delta, \gamma \rightarrow \text{precipitate}$$

Figure 1C:
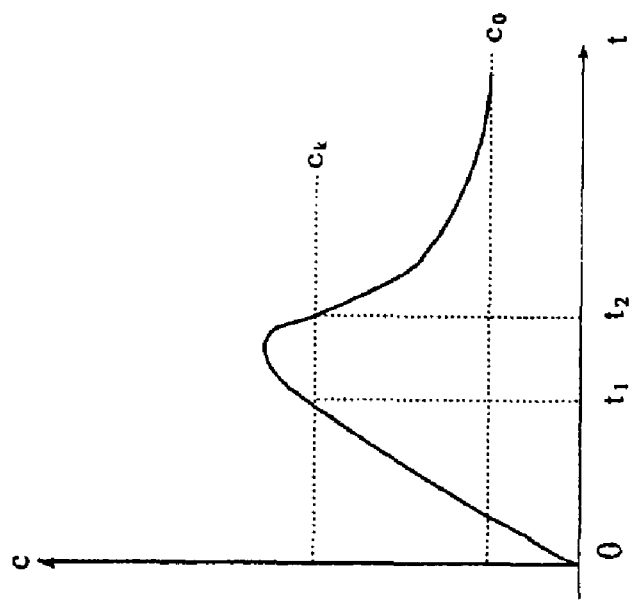
FIGS. 1$a$, 1$b$, and 1$c$ are schematic diagrams for the mechanism of depositing of agglomerates at relatively high initial concentrations.
Figure 1B:
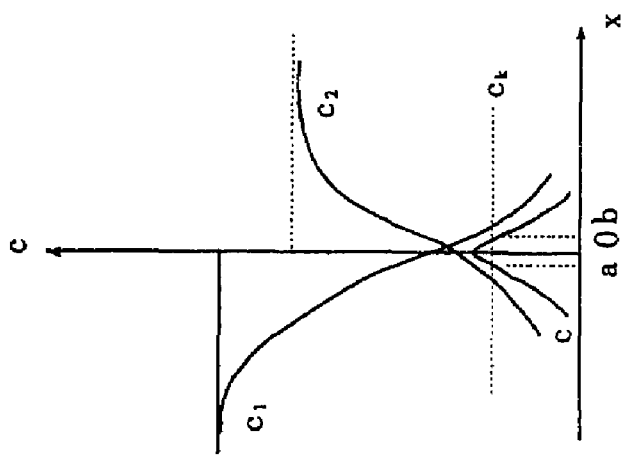
Figure 1A:
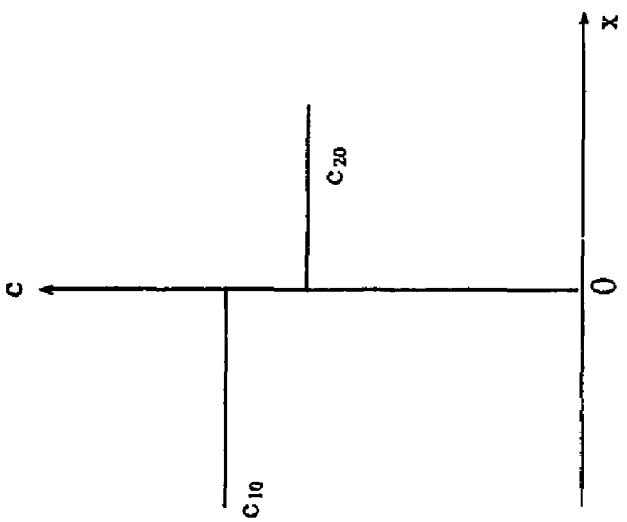

The concentration of $\alpha$, $\beta$ and the precipitated component $\gamma$ are $C_1$, $C_2$, and C respectively. FIGS. 1($a$) and ($b$) indicate the spatial distribution curves for $C_1$, $C_2$ and C at time interval of t=0 and t=t respectively. When C exceeds critical nucleation concentration $C_k$, nucleation could take place within the region of a and b. FIG. 1($c$) indicates the curve of change of concentration against time in the course of explosive nucleation within the region a-b. The curve is just the known "lamer" profile. It is shown in FIG. 1($c$) that after explosive nucleation, diffusion and the separated components formed in reaction could only afford the growth of the nuclei already formed. New nuclei will no longer be formed because the concentration is lower than the critical nucleation concentration Based on the above result, the following deduction could be drawn. When A and B solutions intermingled rapidly in the form of micro liquid agglomerates, the following things will happen: (1) Fresh interfaces of huge surface area are rapidly formed between a definite amount of A and B solutions and then a large amount of pristine nuclei will be explosively formed. The smaller the size of micro liquid agglomerate is, the larger the surface area of fresh interface will be and the more the total number of formed pristine nuclei will be; (2) When the size of the micro liquid agglomerate is decreased, the time of the whole process of molecular diffusion and chemical reaction will correspondingly be shortened. Rapid mixing of micro liquid agglomerates and the explosive formation of all the pristine nuclei will provide good conditions for the simultaneity of the collision coalescence of small particulate to form nanometer particulates, homogeneity of particulate size as well as the decrease of particulate dimension.

Therefore the present invention provides a method of preparing nanometer powder, comprising the following steps:
providing A and B reactant solutions that can rapidly react to form precipitate;
continuously adding respectively A and B solution into mixing and reacting precipitator with a stator and a rotor in operation; and
post-treating the precipitate-containing slurry discharged continuously from the precipitator.

Based on one of the preferred embodiments of the present invention, the method for preparing nanometer powder of the present invention comprises the following steps:
Providing A and B reactant solutions that can rapidly react to form precipitate and further contain auxiliary reacting agent and dispersant besides the reactant, and optionally providing one or more auxiliary reacting solutions that contain at least one of the dispersant, auxiliary reacting agent and pH value adjusting agent;

Continuously adding the provided solution into a mixing and reacting precipitator with stator and rotor, where, the reactant solutions under the action of rapid stirring, shearing and strong turbulence, will rapidly be dispersed, broken into isolated micro liquid agglomerates with very fine size and then complete the process of molecular diffusion, chemical reaction, nucleation and formation of nanometer particulate and precipitate; the Mixing reacting zone of the reactants will be continuously orderly arranged along the advancing direction of mixed solution; the process of mixing, reaction and precipitation on passing through the mixing and reacting precipitator will be completed in short interval of 0.1–10 seconds; then the precipitate containing slurry will continuously flow out of the reaction facility; and After the precipitate containing slurry flows out of the reaction facility, post-treatment should be immediately started.

The form of A and B solutions has no specific limitations. They could both be in the form of aqueous solution (contain pure water), or both in the form of organic solvent solution (contain liquid state pure material), or one of them is in the form of aqueous solution (contain pure water) and the other is in the form of organic solvent solution (contain liquid state pure material). The said auxiliary reacting solution could be either aqueous solution or organic solvent solution. Two reactant solutions of A and B could also contain auxiliary reacting agent and dispersant besides the reactant. Mixing volume ratio for A and B solution could be any ratio, preferably 1:1. The mixing volume ratio for other auxiliary reacting solution could be in any ratio. The temperature of the reactant solution entering the mixing and reacting precipitator could be any temperature necessary to carry out the mixing reaction. For the reactant aqueous solutions, the preferred temperature range is between 15° C. and boiling point of water. For the reactant organic solvent solutions, the preferred temperature range is in the range of 15° C. to the boiling point of the organic solvent.

There is no limitation to the said dispersant, auxiliary reacting agent and pH value adjuster mentioned in (a). They could be those of the conventional type. The dispersant used in example of the present invention for reactant aqueous solution includes lower alcohol and surface active agent. The sulfuric acid $H_2SO_4$ added into $Ti(SO_4)_2$ solution to inhibit hydrolysis could be taken as an example of auxiliary reacting agent.

In step (b), the said reactant solution under the action of vigorous stirring and shearing produces strong turbulence. Solution A and solution B are dispersed, broken into many separated micro liquid agglomerates and fresh interfaces of huge surface area are produced between the two solutions. In the vicinity of these interface, a huge number of pristine nuclei will explosively be formed along with the progress of the process of molecular diffusion and chemical reaction. A and B solutions are intermingled in the form of micro liquid agglomerates and that would induce great shortening of the time necessary for the process of the molecular diffusion and chemical reaction. In the case that the passage time of the solutions through the "mixing and reacting precipitator" is longer than the time of diffusion reaction, the particle diameter of the nanometer particulate could be reduced and hard agglomeration among the nanometer particulates could be lessened or even eliminated by shortening said passage time to 0.2–10 seconds.

Figure 3:
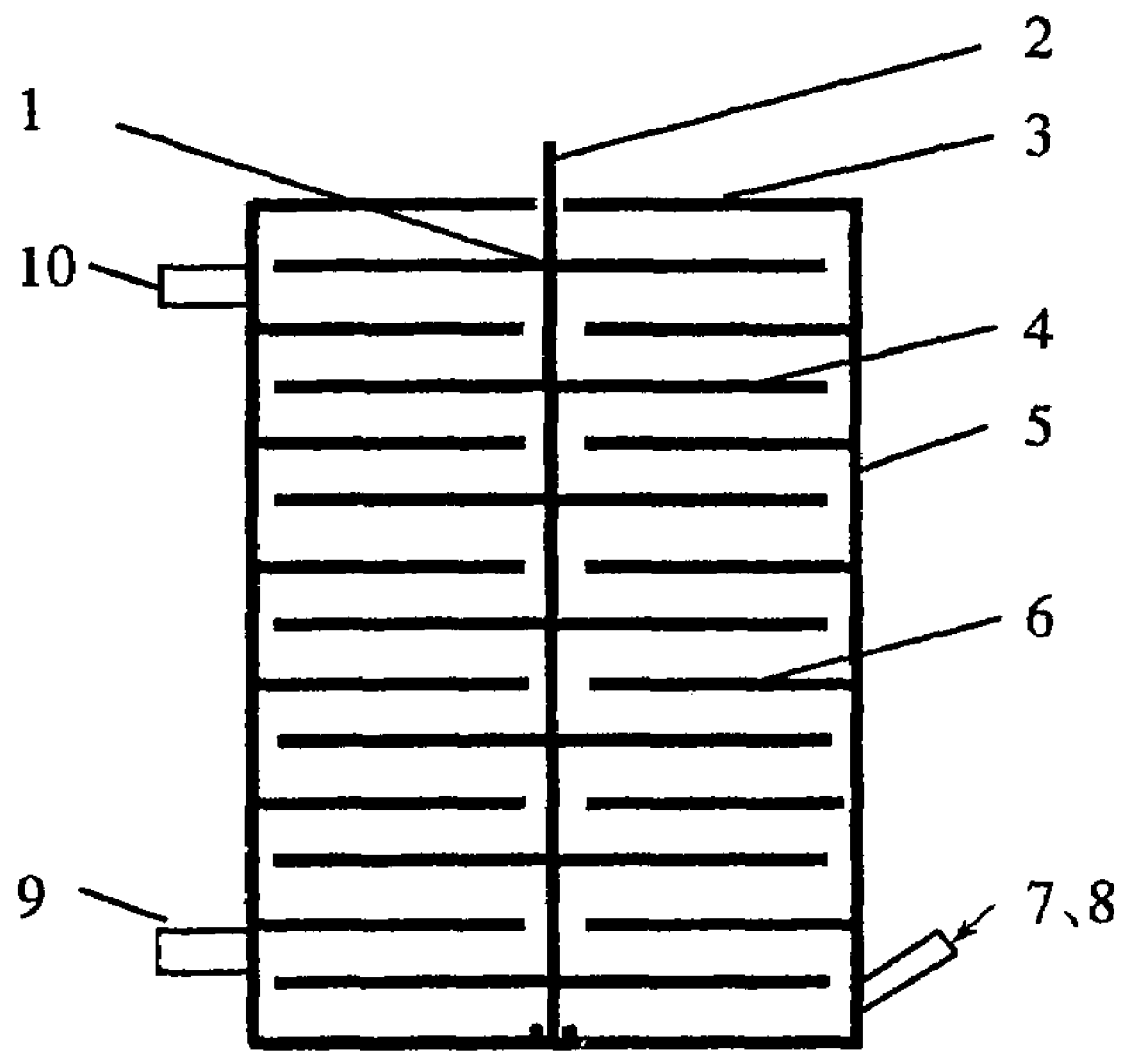
FIG. 3 is the structure schematic diagram for the cylindrical mixing and reacting precipitator.

The mixing and reacting precipitator used in step (b) of the present invention is an on-line dynamic mixer. Particularly, it is a reactor that could bring the reactant solutions into dynamical, rapid and orderly mixing in the form of micro liquid agglomerates. It is known as "dynamic rapid orderly micro liquid agglomerate mixing and reacting precipitator". Mixing and reacting precipitator possesses stator and rotor that could in the form of cylinder, disc or other axis-symmetrical shape. FIG. 3 illustrates a preferred cylindrical "mixing and reacting precipitator" of the present invention. 1 is rotor, 2 is axis of rotation, 3 is stator, 4 is stirring wing of rotor, 5 is outer shell of stator, 6 is stationary stirring wing of stator, or stator without stirring wing (as indicated in FIG. 4), 7 and 8 are inlets for solution A and solution B respectively. They are at one end of the stator, 9 is the optionally inlet for optionally third solution-C solution, 10 is outlet for combined precipitate slurry, lying at the other end of the stator. The difference between inner diameter of the stator and outer diameter of rotor is in the range of 1–1000 mm, preferably in the range of 3–150 mm. Speed of revolution of the rotor is in the range of 500–20000 rpm, most preferably in the range of 800–12000 rpm. The volume of flow for reactant solution passing through reacting precipitator is in the range of 0.02–3000 $m^3/h$. Preferably the volume of flow is determined by the capacity of the mixing and reacting precipitator. Preferably, the time of passing through the inlet and outlet of the precipitator by the solution is controlled within a range of 0.1–10 second. Solution A and B are fed through inlet 7 and 8 and under the action of rapid stirring, shearing and strong turbulence, are rapidly dispersed, broken into isolated very fine micro liquid agglomerates and then complete the process of molecular diffusion, chemical reaction, nucleation and formation of nanometer particle and precipitates. Under the action of liquid flow, difference in pressure and stirring, the mixed solution rotates as it advances along the direction of axis. On the whole, the mixed solution adopts a spiral movement. The mixing reacting precipitating zone of the solution generally is continuously orderly arranged along the advancing direction of the spiral. Finally the slurry flows out of outlet 10 continuously.

Figure 4A:
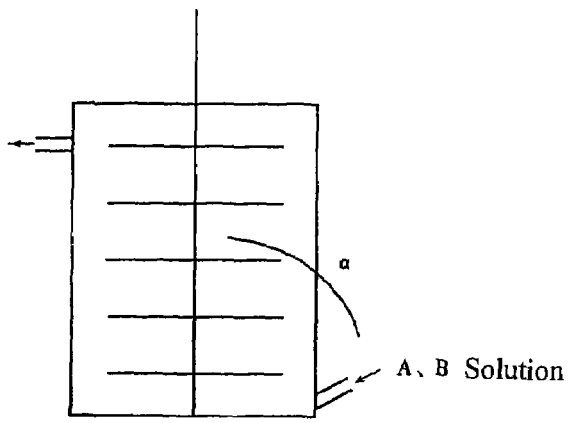
FIGS. 4$a$, 4$b$, 4$c$, and 4$d$ are schematic diagrams for the layout of the solution inlet location of the mixing and reacting precipitator.
Figure 4B:
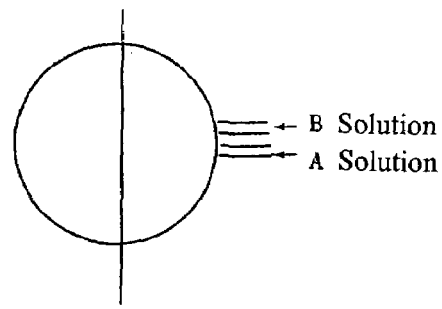
Figures 4C, 4D:
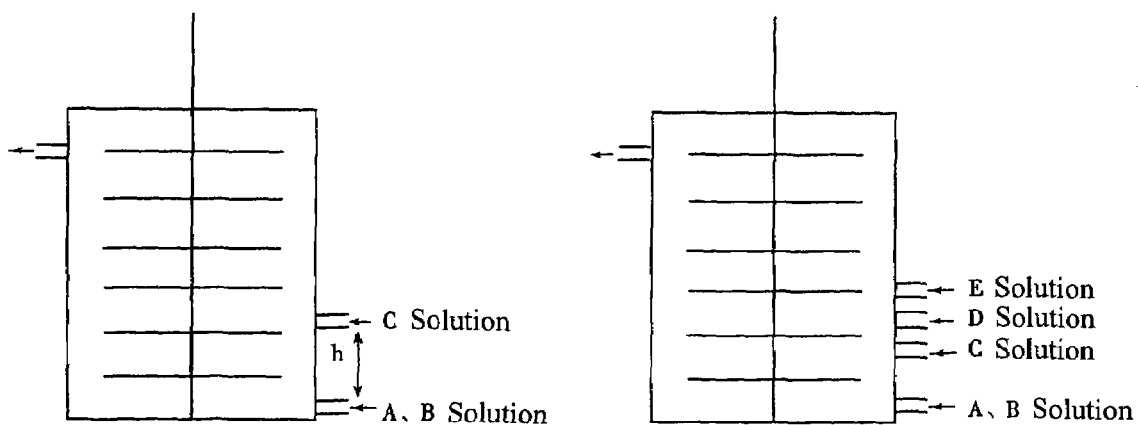

In the preferred embodiment of the present invention, the inlets of the two main reactant solutions A and B are provided near one side of the mixing and reacting precipitator. The relative locations of the two inlets could be arranged at will. However it is preferred that they are arranged parallel and close to each other or are arranged in Co-axial jacketing arrangement. The inlet direction could be arranged at will. As indicated in FIG. 4(a), it is most preferred that the angle between inlet direction and rotation axis satisfies the condition of 45°<a 90°. FIG. 4(b) shows that the inlet of solution A and the inlet of solution B are arranged on the same plane of rotation. If there is only one auxiliary reacting solution-solution C, the axial distance h between inlet of solution C and inlet of solution A or solution B is in the range of zero to half length of dynamic mixing reactor as shown in FIG. 4(c). If there are more than one auxiliary solution, their inlets could be arranged around the cylinder on the same plane perpendicular to the axis of rotation or could be successively arranged along the axis of rotation on the cylinder as shown in FIG. 4(d).

Figures 5A, 5B:
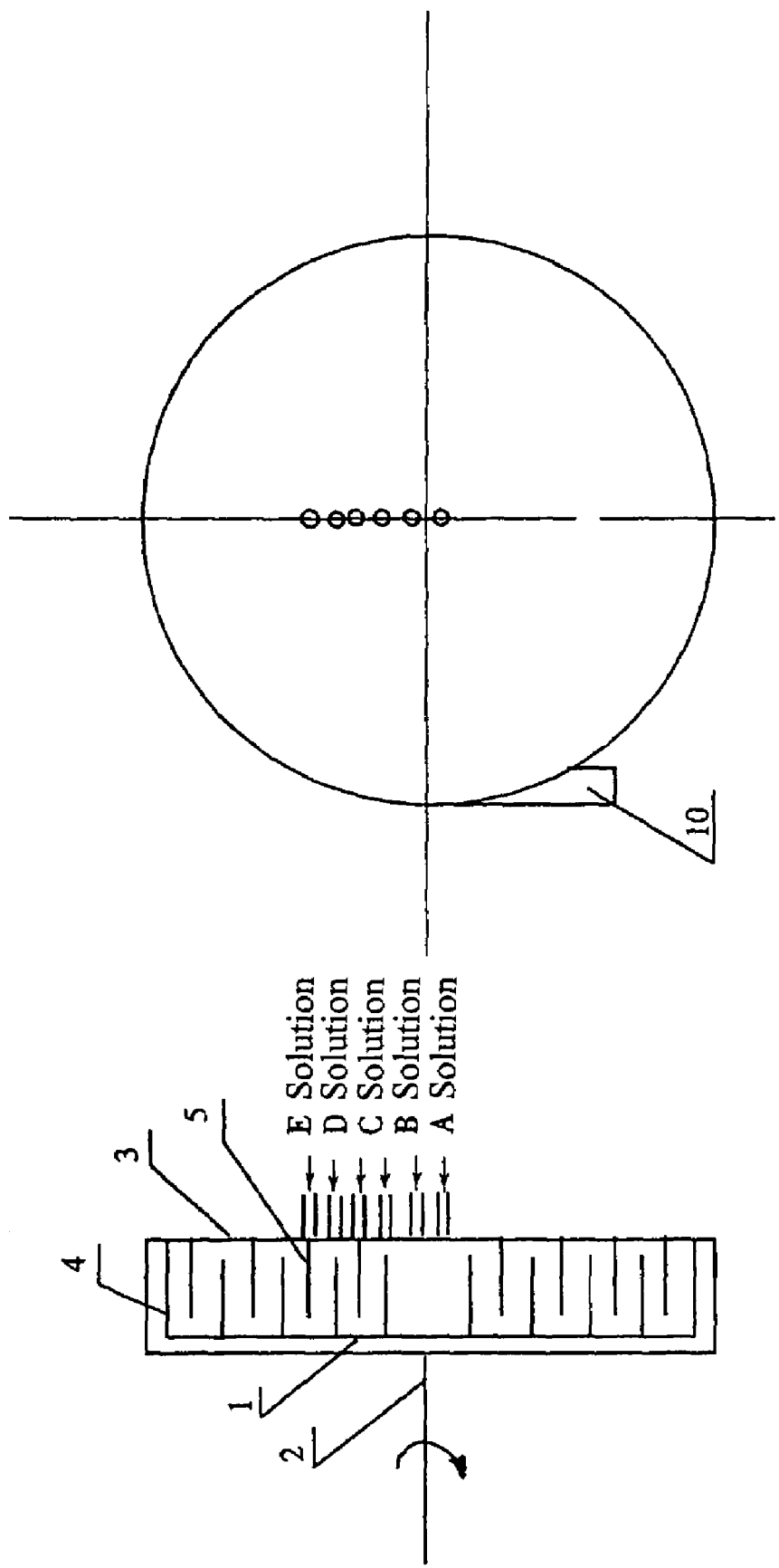
FIGS. 5$a$ and 5$b$ are structure schematic diagrams for the disc shape mixing and reacting precipitator.
Figure 6A:
FIGS. 6$a$, 6$b$, 6$c$, and 6$d$ are TEM micrographs of $ZrO_2$ nanometer powder.
Figure 6B:
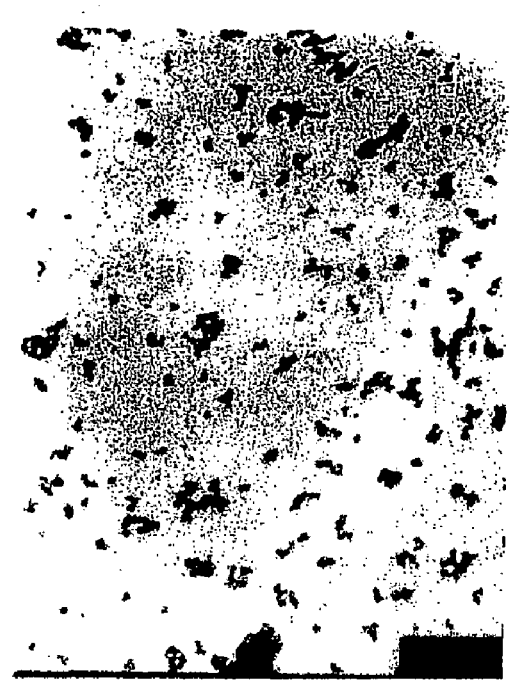
Figure 6C:
Figure 6D:

The mixing and reacting precipitator could also be in the shape of disc as shown in FIG. 5 and the diameter of stator is 150–10000 mm, preferably 200–1000 mm. 1 is rotor, 2 is axis of rotation, 3 is stator, 4 is stirring wing of rotor, 5 is stationary stirring wing of stator or stator without stirring wing and 10 is outlet for the mixed precipitated slurry. At this time, the inlets of the two major reactant solutions A and B are provided on the stator near the central rotating axis. The inlets of more than one auxiliary solutions C, D, E are provided at the spots that are at a distance of half of the radius of stator from the rotating axis and are successively arranged in the order of different distance from the rotating axis. The outlet 10 for precipitate containing mixed fluid is arranged at the outer fringe of stator disc. Alternatively, the inlet of reactant solution could be provided at the outer fringe of stator disc, the inlet of auxiliary solution is provided near the outer side of the radius of stator disc while the outlet of the precipitate-containing mixed fluid is provided at the stator disc near the center of rotating axis.

Figure 2:
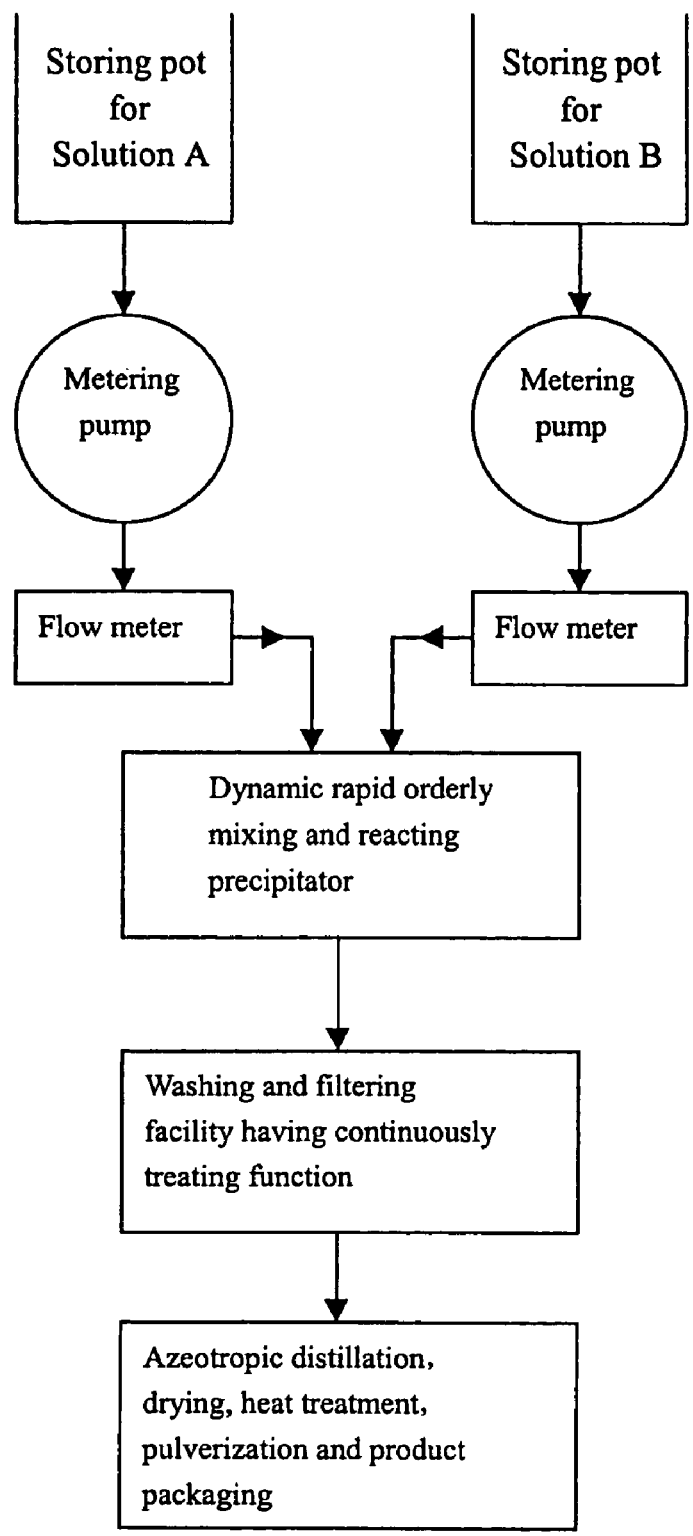
FIG. 2 is the process flow diagram for the method of the present invention.

FIG. 2 shows a flow diagram of a preferred process of the present invention. In the figure, solution A and solution B are stored in the liquid storing pot, fed into "mixing and reacting precipitator" through metering pump and flow meter respectively. After the precipitate-containing mixed slurry is continuously flowed out, it enters into washing and filtering facility having continuously treating function and then it is subjected to other post-treatment steps.

In the step (c) of the present invention, from precipitating slurry to obtaining qualified nanometer grade product, post-treatment could include (but not limited to): Separation, preferably include filtration and washing, preferably utilizing facility that could operating continuously, wherein the type of washing could include ionic electric field dialysis, water or organic solvent washing and etc; Azeotropic distillation which can be carried out by using different compound; Drying which could be performed by using one or more of the following methods: conventional drying, spray drying, vacuum drying, freeze drying and supercritical drying; Heat treatment, at a preferred temperature in a range of 200–1000° C.; Pulverization which could be performed by, for example, ultrasonic. The amount and running order of the above-mentioned post-treatment steps could be adjusted according to the types of the product and detailed request of the customer.

The method of the present invention could be applied to different reactions that are capable of reacting rapidly and forming precipitates. Therefore there is no specific limitation on the kinds of precipitates and formed nanometer powders provided by the present invention. For instance, metals (include alloys), oxides, hydroxides, salts, phosphides and sulfides or organic compounds are all in the scope of the present invention.

As compared with the existing technology, the method of the present invention possesses the following advantages: (1) Particulate diameter of the nanometer particulates is adjustable and the homogeneity of the particle size is very good. Particulates with diameter in the range of 1–100 nm could be prepared at will; (2) The particulates are well dispersed with no hard agglomeration. As a result, nanometer powders with excellent dispersity are obtained; (3) This method can give a high yield and can be used in large-scale production; (4) The process is simple and low in consumption of energy.

Detailed illustrations of examples of the present invention are further given combined with the attached figures in the following. However, these examples do not impose any limitation in any form on the scope of the present invention.

EXAMPLES

Example 1

257.8 g of zirconyl chloride ($ZrOCl_2 \cdot 8H_2O$, molecular weight 322.25, purity 99%) was weighed to prepare 1000 ml aqueous solution of $ZrOCl_2$ with concentration of 0.8 mol/L and was designated as solution A. 500 ml ethanol (95%) used as dispersant was added into 120 ml of ammonia water diluted by twice distilled water (concentration of $NH_3$ was 25%) to make 1000 ml aqueous solution and was designated as solution B, all at room temperature of 20° C. Based on the process flow diagram shown in FIG. 2, solution A and solution B were allowed to pass through "mixing and reacting precipitator" for dynamic rapid orderly micro liquid agglomerate shown in FIG. 3 to be mixed, reacted and precipitated. The pH value could be adjusted by the amount of ammonia water used and the pH value at end point is in the range of 8–9. The inner diameter and length of the stator of cylindrical "mixing and reacting precipitator" are 90 mm and 240 mm respectively. The revolution speed of rotor is 3000 rpm. The inlets for A and B reactant solutions are parallel to each other and were provided on the same plane of rotation. The volume of flow of each of the solutions entering "mixing and reacting precipitator" was both 80 L/h. The precipitate-containing slurry entered continuous treating facility to be washed and filtered and then was azeotropically distilled with n-butanol, dried, separated into two portions, calcinated at 620° C., 720° C. for 45 min and yielded respectively $ZrO_2$ nanometer powder with average particle diameter of 17 nm and 23 nm. Both the homogeneity of the particulate diameter and inter-particulate dispersity were relatively good. TEM micrograph of the powder calcinated for 45 min was shown in FIG. 6. The corresponding temperature of calcination for FIGS. 6(*a*) and 6(*b*) was 620° C. and that for FIGS. 6(*c*) and 6(*d*) was 720° C. Since the amount of residue of the whole system and "dynamic mixing reactor" would have an effect on the yield, comparative experiment in beaker was performed and the yield of $ZrO_2$ was 94%.

Example 2

Figure 7:
FIG. 7 is the TEM micrograph of ZnO nanometer powder.

139 g of $ZnCl_2$ was weighed to prepare 1000 ml aqueous solution of $ZnCl_2$ at concentration of 1.0 mol/L at 95° C. designated as solution A. Ethanol (95%) used as dispersant was added into 165 ml of ammonia water (25%) to make 1000 ml of ethanol solution whose $NH_3$ concentration was 1.0 mol/L at 30° C. Based on the process flow diagram shown in FIG. 2, solutions A and B were allowed to pass through the "mixing and reacting precipitator" for dynamic rapid orderly micro liquid agglomerate shown in FIG. 3 to be mixed, reacted and precipitated. The pH value could be adjusted by the amount of ammonia water used and the pH value at end point is in the range of 7–8. The inner diameter and length of the stator of cylindrical "mixing and reacting precipitator" are 90 mm and 240 mm respectively. The revolution speed of rotor is 3000 rpm. The inlets for A and B reactant solutions are parallel to each other and were provided on the same plane of rotation. The volume of flow of each of the solutions entering "mixing and reacting precipitator" was 80 L/h. The precipitate-containing slurry entered into the continuous treating facility to be washed and filtered and then was azeotropically distilled with n-butanol, dried, calcinated at 520° C. for 2 h and yielded ZnO nanometer powder with average particle diameter of 46 nm. Both the homogeneity of the particulate diameter and inter-particulate dispersity were relatively good. TEM micrograph of the powder was shown in FIG. 7. Since the amount of residue of the whole system and "dynamic mixing reactor" would have an effect on the yield, comparative experiment in beaker was performed and the yield of ZnO was 92%.

Example 3

Figure 8:
FIG. 8 is the TEM micrograph of $BaTiO_3$ nanometer powder.

160 ml of anhydrous ethanol solution of $TiCl_4$ and 72.16 g of $BaCl_2$ were mixed and diluted with twice distilled water. 230 ml of ethanol (95%) was added to prepare aqueous ethanol solution of $TiCl_4$ and $BaCl_2$ both with the concentration of 0.28 mol/L was designated as solution A. The temperature is 20° C. 87.75 g of ammonium oxalate was weighed and 188 ml of ethanol (95%) was added. Twice distilled water was used to prepare 1000 ml ethanol aqueous solution whose ammonium oxalate concentration was 0.616 mol/L and was designated as solution B. Solution B was heated to 80° C. Taking 1000 ml of ethanol (95%) as dispersant and was heated to 60° C., designated as solution C. Based on the process flow diagram shown in FIG. 2, solution A, solution B and solution C were allowed to pass through "mixing and reacting precipitator" for dynamic rapid orderly micro liquid agglomerate to be mixed, reacted and precipitated. Small amount of ammonia water was added into solution B as a pH value regulator to adjust the pH value of the mixed precipitate fluid to 3–4. The inner diameter and length of the stator of cylindrical "mixing and reacting precipitator" were 90 mm and 240 mm respectively. The revolution speed of rotor was 3000 rpm. The inlets for A and B reactant solutions were parallel to each other and was provided on the same plane of rotation. As indicated in FIG. 4(*b*), the distance h between the inlet of C auxiliary reacting solution and inlet of A and B along the axis was 12 mm. The volume of flow of each of the solution entering "mixing and reacting precipitator" was all 80 L/h. The precipitate-containing slurry entered continuous treating facility to be washed and filtered and then was azeotropically distilled with n-butanol, dried, calcinated at 720° C. for 2 h and yielded $BaTiO_3$ nanometer powder with average particle diameter of 39 mm. Both the homogeneity of the particulate diameter and inter-particulate dispersity were relatively good. TEM micrograph of the powder was shown in FIG. 8. Since the amount of residue of the whole system and "dynamic mixing reactor" would have an effect on the yield, comparative experiment in beaker was performed and the yield of $BaTiO_3$ was 85%.

Example 4

Figure 9:
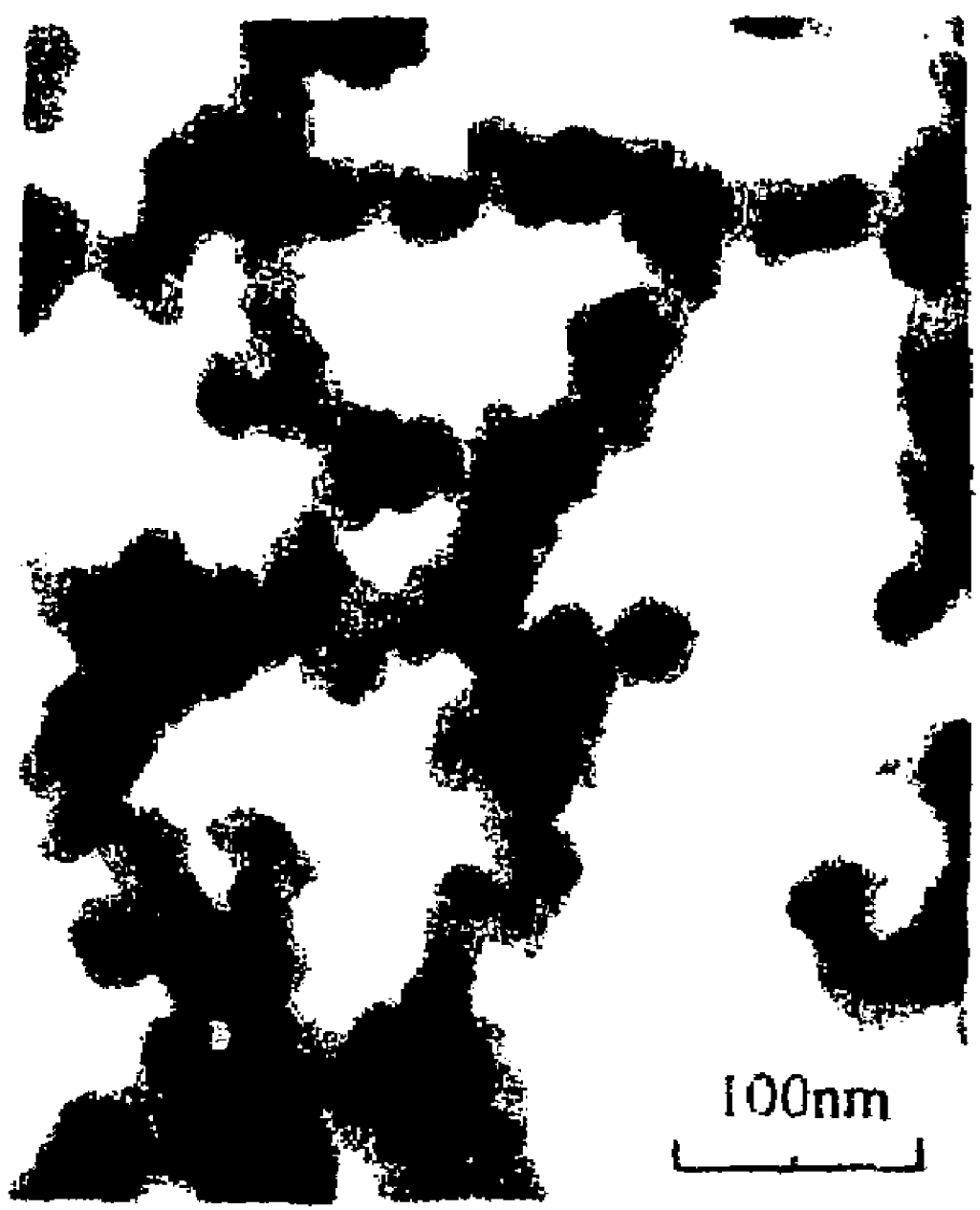
FIG. 9 is the TEM micrograph of Cu nanometer powder.

185 ml of formaldehyde and 126 g of $CuSO_4$ were mixed and diluted with twice distilled water to prepare 1000 ml solution of $CuSO_4$ with the concentration of $CuSO_4$ at 0.5 mol/L. The resulting solution was designated as solution A. The temperature is 70° C. 166.7 g of NaOH was weighed and 6 g of dodecyl sulfonic acid was added as dispersant. Twice distilled water was used to prepare 1000 ml aqueous solution whose NaOH concentration was 1.0 mol/L and was designated as solution B. The temperature was 70° C. Based on the process flow diagram shown in FIG. 2, solution A and solution B were allowed to pass through "mixing and reacting precipitator" (FIG. 3) for dynamic rapid orderly micro liquid agglomerate to be mixed, reacted and precipitated. Ammonia water was added as a pH value regulator to adjust the pH value of the mixed precipitate fluid to 13–14. The inner diameter and length of the stator of cylindrical "mixing and reacting precipitator" are 90 mm and 240 mm respectively. The revolution speed of rotor is 3000 rpm. The volume of flow of each of the solution entering "mixing and reacting precipitator" was all 80 L/h. The precipitate-containing slurry entered into the continuous treating facility to be washed and filtered and then was azeotropically distilled with n-butanol, dried, calcinated and yielded Cu nanometer powder with average particle diameter of 40 nm. Both the homogeneity of the particulate diameter and inter-particulate dispersity were relatively good. TEM micrograph of the powder was shown in FIG. 9. Since the amount of residue of the whole system and "dynamic mixing reactor" would have an effect on the yield, comparative experiment in beaker was performed and the yield of Cu was 88%.

What is claimed is:

1. A process for preparing a nanometer powder, comprising:
    (a) providing a reactant solution A and a reactant solution B that can rapidly react to form a precipitate;
    (b) continuously adding said solution A and solution B into a mixing and reacting precipitator with a stator and a rotor in operation, respectively, thereby obtaining a precipitate-containing slurry, wherein mixing, reacting and precipitation is completed in a short interval of 0.1 to 10 seconds; and
    (c) post-treating the precipitate-containing slurry discharged continuously from the mixing and reacting precipitator.

2. The process as claimed in claim 1, wherein said solution A and solution B of step (a) comprise an auxiliary reacting agent and/or dispersant.

3. The process of claim 1, further comprising providing in said step (a) at least one auxiliary reacting solution selected from a group consisting of a dispersant, an auxiliary reacting agent and a pH regulator.

4. The process of claim 3, wherein, when there is only one auxiliary reacting solution, a distance h in an axis direction between an inlet of said auxiliary solution of a cylindrical mixing and reacting precipitator and inlets for solution A and solution B is in the range of zero to half of the axis-direction length of said mixing and reacting precipitator.

5. The process of claim 3, wherein, when there is a plurality of auxiliary reacting solutions, inlets of said plurality of auxiliary solutions on a cylindrical mixing and reacting precipitator and inlets for the solution A and the solution B are arranged around the cylindrical mixing and reacting precipitator on the same plane perpendicular to a rotating axis, or arranged successively on the cylindrical mixing and reacting precipitator along the rotating axis.

6. The process as claimed in claim 1, wherein said solution A and said solution B in step (a) are independently in the form of aqueous solution or organic solution.

7. The process of claim 6, wherein a temperature of said aqueous solution or organic solution is in a range from 15° C. to a boiling point thereof.

8. The process of claim 1, further comprising:
    in said step (b), rapidly dispersing said solution A and solution B by rapid stirring, shearing and strong turbulence, thereby breaking it into isolated micro liquid agglomerates and then completing a process of molecular diffusion, chemical reaction, nucleation and formation of nanometer particulate and of precipitate wherein mixing reacting zones are continuously orderly arranged along an advancing direction of the mixed solutions A and B, whereby step (b) is completed in a short interval of 0.1 to 10 seconds, wherein the precipitate-containing slurry continuously flows out of the mixing and reacting precipitator.

9. The process of claim 1, wherein, in step (b), said mixing and reacting precipitator is comprised of one stator and one rotor on the same axis, a speed of revolution of the rotor is in the range of 500 to 20000 rpm, a volume of flow of the reactant solution passing through the mixing and reacting precipitator is in the range of 0.02 to 3000m$^3$/h.

10. The process of claim 9, wherein said stator or rotor comprises a stirring wing.

11. The process of claim 9, wherein said speed of revolution is between 800 and 12000 rpm.

12. The process of claim 1, wherein, in step (b), the mixing and reacting precipitator has a shape of a cylinder or a disc or any other symmetric form.

13. The process of claim 1, wherein in step (b) said mixing and reacting precipitator has a cylinder shape, and comprises two inlets for the reactant solutions and one or more inlets for auxiliary solutions installed on one side of the precipitator and an outlet for precipitate-containing mixed solution installed on the other side, wherein the difference between an inner diameter of the stator and an outer diameter of the rotor is in the range of 2 to 1000 mm.

14. The process of claim 13, wherein said difference between the inner diameter of the stator and the outer diameter of the rotor is in the range of 3 to 150 mm.

15. The process of claim 1, wherein, in step (b), when the mixing and reacting precipitator is of a cylinder-shape, a diameter of the stator is in the range of 150 to 10000 mm, inlets for the reactant solutions A and B are arranged on the stator, inlets for one or more auxiliary solutions are arranged within a half of the stator radius from the rotating axis and are arranged successively according to different values of a distance from the rotating axis, an outlet for the precipitate-containing slurry is arranged at an outer fringe of a disc of the stator, or the inlet of the reactant solutions A and B is arranged at the outer fringe of the disc of the stator, the inlet for the auxiliary solutions is provided near the outer fringe of the radius of the disc of the stator and the outlet of the precipitate-containing slurry is provided on a portion, near the center of rotating axis, of the disc of the stator.

16. The process of claim 15, wherein the diameter of the stator is between 200 and 1000 mm.

17. The process of claim 1, wherein said step (c) is started, after said precipitate-containing slurry flows out of the mixing and reacting precipitator continuously.

18. The process of claim 17, wherein said post-treating is started immediately after said precipitate-containing slimy flows out of the mixing and reacting precipitator.

19. The process of claim 1, wherein, said post-treating in step (c) comprise separation, drying and pulverization steps.

20. The process of claim 19, wherein said separation step comprises filtration and washing.

21. The process of claim 20, wherein said drying step further comprises azeotropic distillation.

22. The process of claim 20, wherein said filtration and washing is performed in a continuously operating facility.

23. The process of claim 1, wherein said nanometer powder is at least one selected from a group consisting of metals, oxides, hydroxides, salts, phosphides, sulfides and organic compounds.

* * * * *

UNITED STATES PATENT AND TRADEMARK OFFICE
CERTIFICATE OF CORRECTION

| | | |
|---|---|---|
| PATENT NO. | : 7,211,230 B2 | |
| APPLICATION NO. | : 10/471142 | |
| DATED | : May 1, 2007 | |
| INVENTOR(S) | : Yingyan Zhou et al. | |

It is certified that error appears in the above-identified patent and that said Letters Patent is hereby corrected as shown below:

At column 4, line 34 (Approx.), please delete "concentration" and insert -- concentration. --, therefore.
At column 9, line 41, please delete "39 mm." and insert -- 39nm. --, therefore.
At column 12, line 15 (Approx.) in Claim 18, please delete "slimy" and insert -- slurry --, therefore.
At column 12, line 17 (Approx.) in Claim 19, please delete "wherein" and insert -- wherein --, therefore.

Signed and Sealed this

Fourth Day of December, 2007

JON W. DUDAS
*Director of the United States Patent and Trademark Office*